United States Patent [19]

Fuwa

[11] 3,800,080

[45] Mar. 26, 1974

[54] FACSIMILE DEVICE

[75] Inventor: Jyoichi Fuwa, Tokyo, Japan

[73] Assignee: Ricoh Co., Ltd., Tokyo, Japan

[22] Filed: May 10, 1972

[21] Appl. No.: 251,976

[52] U.S. Cl. .................................. 178/7.1, 178/7.6

[51] Int. Cl. .............................................. H04n 3/08

[58] Field of Search .................. 178/7.6, 7.7, 6, 7.1; 179/15 A

[56] References Cited

UNITED STATES PATENTS

| | | | |
|---|---|---|---|
| 2,996,581 | 8/1961 | Lord et al. | 178/6 |
| 3,686,437 | 8/1972 | Leonard | 178/7.6 |

*Primary Examiner*—Robert L. Griffin

*Assistant Examiner*—Joseph A. Orsino, Jr.

*Attorney, Agent, or Firm*—Henry T. Burke

[57] ABSTRACT

A facsimile device is provided which sends data signals onto a transmission line at a constant speed even though the scanning speed is varied along the scanning line. Video signals derived by scanning the subject copy are sampled, and the sampled data signals derived from each scanning are stored alternately into one of two buffer shift registers. While one of the two registers is storing the data signals, the other register send the data signals at a constant speed onto the transmission line. The sampling pulse train and the pulse train which is used for shifting the register which is storing the data signals are frequency modulated in accordance with the scanning speed of a scanning point on the subject copy so that the stored data is speed corrected at the time of storing.

6 Claims, 6 Drawing Figures

FACSIMILE DEVICE

BACKGROUND OF THE INVENTION

The present invention relates to a facsimile device of the type in which the video signals derived from a subject copy by a rotary polyhedral mirror are electrically compensated in a transmitting station so that the video signals may be processed with ease in a receiving station.

Known is a facsimile device of the type having a scanning mechanism in which a rotary polyhedral mirror rotating at constant speed is used to optically scan a subject copy in order to derive video signals therefrom. However, the facsimile device of the type described has a serious defect in that the scanning speed is varied along the scanning line when the subject copy being scanned is flat. The scanning speed at the center or at the point immediately below the polyhedral mirror is different from the scanning speed at the side edges of the subject copy. That is, the scanning speed at the portions along the scanning line in the proximity of the side edges of the subject copy becomes faster than the scanning speed at the center of the scanning line. In the prior art facsimile devices, the subject copy is placed and curled in order to overcome this problem. However, it is very difficult to curl the subject copy especially when the latter is a book or the like.

SUMMARY OF THE INVENTION

The present invention provides a facsimile device which may electrically compensate for the variation in scanning speed in a transmitting station and may transmit the data at a constant speed.

Briefly stated, according to the present invention the video signals derived by scanning a subject copy are sampled, and the sampled data signals obtained by each scanning are alternately stored into one of two memory means. The sampling pulse train and the pulse train which is used for shifting the one of the two memory means which is storing the data signals are frequency modulated in response to the scanning speed of a scanning point upon the subject copy. The data signals are sent over a transmission line at a constant speed from one of the two memory means while the other is storing the data signals.

According to the present invention, even though the speed for scanning the flat subject copy is varied along the scanning line, the variation in scanning speed may be electrically compensated for in a transmitting station so that the subject copy such as a book or the like which is difficult to curled may be transmitted by a facsimile device of the type using a rotary polyhedral mirror as if the scanning were made at a constant speed. Thus, the data transmission can be accomplished with a higher degree of accuracy.

The and objects, features and advantages of the present invention will become more apparent from the following description of the preferred embodiment thereof taken in conjunction with the accompanying drawing.

DESCRIPTION OF THE PREFERRED EMBODIMENT

Figure 1:
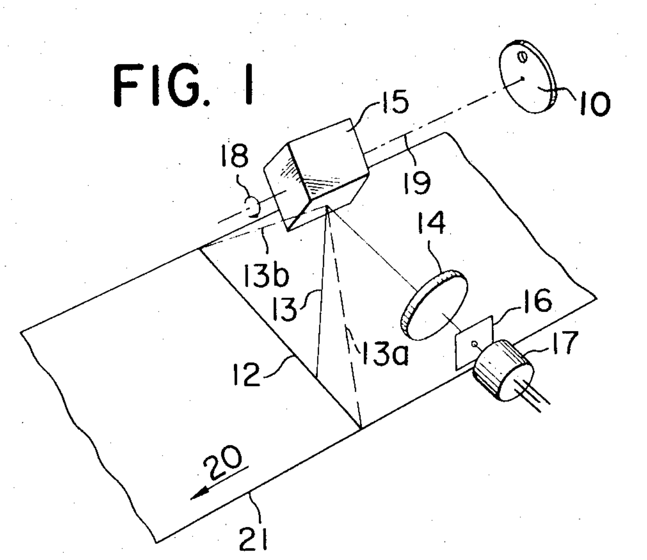
FIGS. 1 and 2 are views used for explanation of the function of a rotary polyhedral mirror and its associated component parts used in a facsimile device in accordance with the present invention.

Referring first to FIG. 1, a subject copy 21 is advanced in the direction indicated by the arrow 20, and the elementary areas of the subject copy 21 are scanned across its width along a line 12 so that the light images of the elementary areas scanned are focused upon a pin hole or aperture plate 16 through a rotary polyhedral mirror 15 and an objective lens 14. The polyhedral mirror 15 rotates about an axis 19 in the direction indicated by the arrow 18 so that the light beam 13 to the polyhedral mirror 15 moves between the dashed lines 13*a* and 13*b*. The light images of the elementary areas focused upon the pin hole plate 16 are converted into the electrical video signals by a photoelectric transducer 17.

Figure 2:
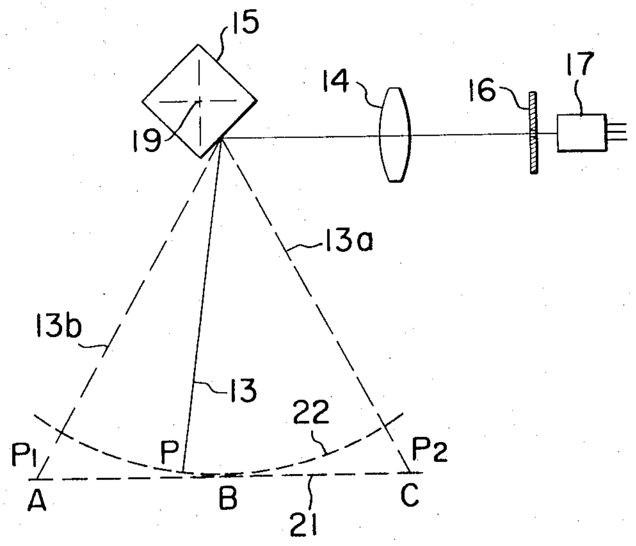
Figure 5:
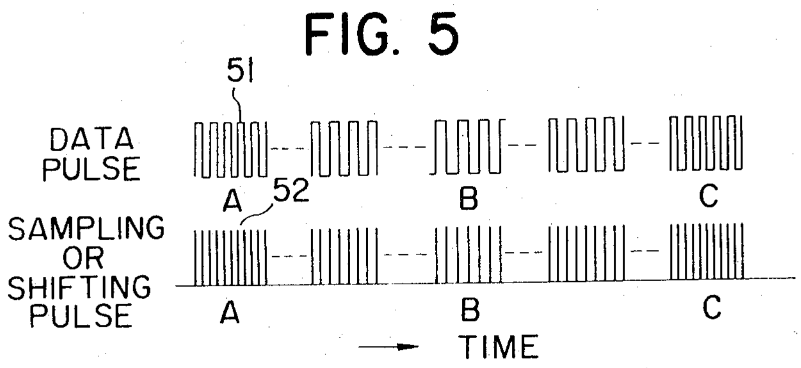
FIG. 5 illustrates the waveforms of the data pulses and of the sampling or shifting pulses when a subject copy having black and white images spaced apart by the same distance is scanned and the data signals thus obtained are transmitted as if the scanning speed were constant.

Next referring to FIG. 2, it is readily seen that if the mirror 15 rotates at a constant speed the scanning speed for scanning the elementary areas along line 12 close to the points A and C is different from that for scanning the elementary areas at and close to the point B since if the end of light beam 13 is considered to be a scanning point moving along line 12 the distance covered per unit time will vary. In other words, the scanning speed v for scanning the elementary areas on line 12 at and close to the points A and C becomes faster than the scanning speed v for scanning the elementary areas at and close to the point B since more distance is covered by the scanning point per unit time near the ends of the line. As a result, if the subject copy 21 has the black and white images or patterns spaced apart from each other by the same distance, as indicated by the broken lines in FIG. 2, data output pulse waveforms 51 as shown in FIG. 5 are derived from the photoelectric transducer 17. The frequency of the data pulses varies depending upon the scanning speed. That is, the frequency of the data pulses representing the elementary areas at and close to the points A and C at which the scanning speed is faster is higher than the frequency of the data pulses representing the elementary areas at and close to the point B at which the scanning speed is slower. If the data pulses 51 are transmitted on a transmission line to a receiving station, the recording mechanism in the receiving station must be synchronized with the scanning mechanism in the transmitting station and must compensate the variation in scanning speed along line 12 in recording the transmitted data pulses along a similar line. In general the recording mechanism in the receiving station is synchronized with the scanning mechanism in the transmitting station so that the elementary areas of the subject copy transmitted may be scanned for recording at a constant speed. The device used in the receiving station for attaining the constant scanning speed for recording is complex in construction so that if the data pulses to be transmitted from the transmitting station are properly corrected as if the subject copy were being scanned at a constant scanning speed, the recording mechanism on the side of the receiving station would be much simplified.

Figure 4:
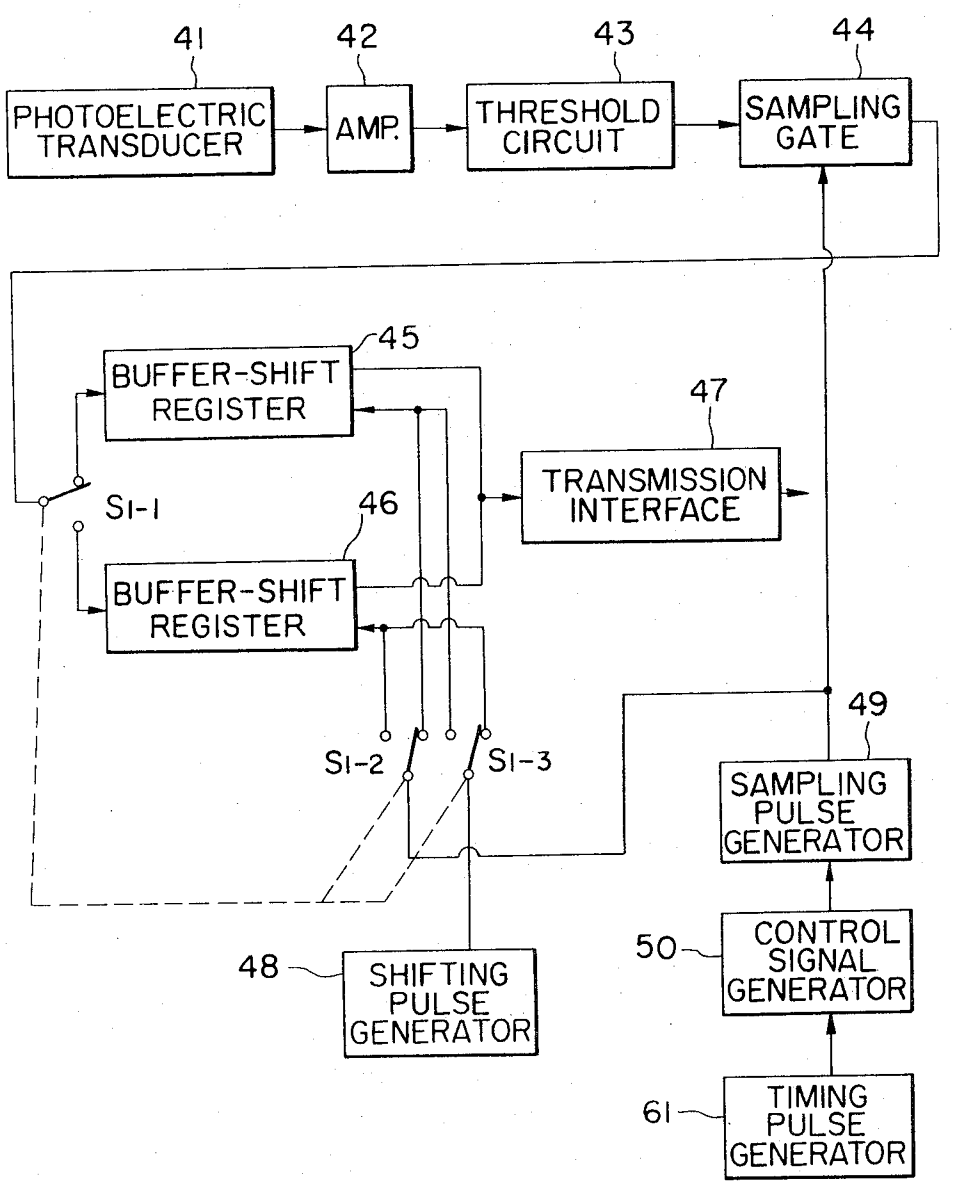
FIG. 4 is a block diagram of the major part of the device of the present invention.

A system in accordance with the present invention is shown in FIG. 4. A light signal representing the blackness of each elementary area is received by a photoelectric transducer 41 (corresponding to transducer 17 in FIGS. 1 and 2) and is converted into an electrical signal or pulse which is amplified to a desired level by an amplifier 42. The output of the amplifier 42 is shaped by a threshold circuit 43 and is fed into a sampling gate 44 from which is derived a train of pulses which represent the blackness of the elementary areas scanned along the scanning line. The pulse train is fed into a first or second buffer shift register 45 or 46 through a contact or contactless switch $S_{1-1}$. Each of the buffer shift registers 45 and 46 has the number of storage bits equal to the number of elementary areas along the scanning line 12 of the subject copy 21 (See FIG. 1). In the instant embodiment, it is assumed that the light beam P starts the scanning from the point $P_1$ along the scanning line 12 to the point $P_2$ as shown in FIGS. 1 and 2, and that immediately before the start of the scanning the switch $S_{1-1}$ switch from the buffer shift register 46 to the register 45 (or vice versa) so that the buffer shift register 45 may be cleared or reset. Referring back to FIG. 4, the switches $S_{1-1}$, $S_{1-2}$, and $S_{1-3}$ are interlocked so that when the switch $S_{1-1}$ selects the buffer shift register 45, switch $S_1$-2 connects register 45 with sampling pulse generator 49 and switch $S_1$-3 connects constant pulse rate generator 48 to constant pulse rate generator 48. As a result shift pulses of a predetermined frequency are applied from constant pulse rate generator 48 to the buffer shift register 46 to cause it to transmit the data stored therein at constant speed to a transmission interface 47 while the sampling pulses from generator 49 are are applied to shift register 45 to also act as shift pulses.

Figure 3:
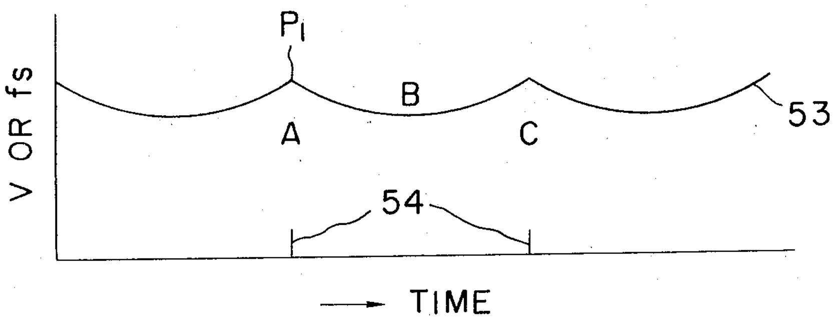
FIG. 3 is a graph used for explanation of the scanning speed characteristics of the device shown in FIGS. 1 and 2.

When the scanning speed varies as shown in FIG. 3, if the frequency of the sampling pulses 52 from generator 49 is varied similarly as indicated FIG. 5, the data pulses 51 will be sampled and stored in a manner which corrects for the speed variation. Accordingly, the output signal of a control signal generator 50, which is adapted to conform to the curve 53 in FIG. 3, is used to modulate the output frequency of pulses 52 from generator 49. The output signal 53 is in turn keyed in synchronism with the scanning operation by the output of a timing pulse generator 61, which generates a timing pulse 54 at the start of each scan. As a result of the control of sampling pulse generator 49 by generators 50 and 61 the sampling density along the scanning line may be made constant. Thus sampled data is stored in the buffer shift register 45 which is shifted in synchronism with the sampling pulses. Hence, all the sampling data may be fed in speed corrected form into the buffer shift register 45. For this purpose, the number of bits in each of the buffer shift registers 45 and 46 is made to be equal to the sampling pulses of one scanning. Upon completion of one scanning, the switch $S_{1-1}$ selects the buffer shift register 46 so that the data obtained by the next scanning may be fed into the buffer shift register 46 while the data stored in the buffer shift register 45 is shifted in response to the shift pulses from shift pulse generator 48 and transmitted constant speed through transmission interface 47. Thus, in the receiving station the recording mechanism may be operated as if the scanning is being made at a constant speed in the transmitting station.

Figure 6:
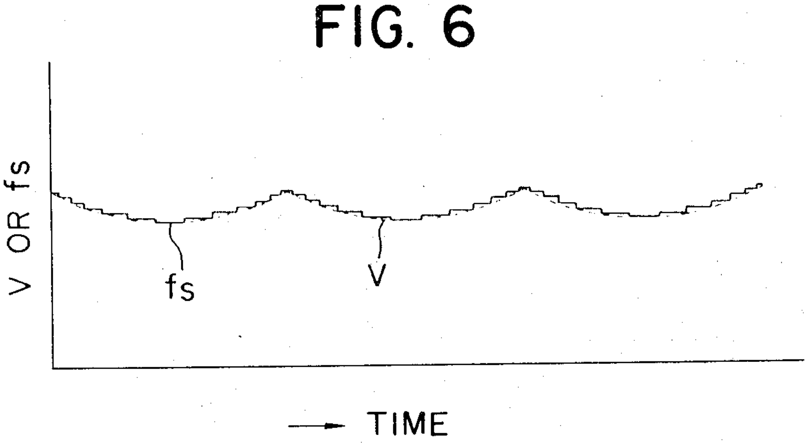
FIG. 6 illustrates the waveform of the sampling and shift pulses which are varied stepwise.

The speed for shifting all the data stored in the buffer shift register 45 while the new data are being fed into the buffer shift register 46 must be equal to or faster than the scanning speed. The timing pulse generator 61, which produces pulses 54 used for indicating the starting point of the scanning, may take the form of a timing pulse generating disk 10 carried by the shaft 19 (See FIG. 1). Alternatively, a chart for generating timing pulses which is located in the proximity of the scanning line 12 may be scanned simultaneously when the subject copy 21 is scanned so that the timing pulses may be generated. For this purpose, a half mirror (not shown) may be interposed between the objective lens 14 and the photoelectric transducer 17 so that the light beam reflected from the half mirror may be focused upon another pin hole plate and another photoelectric transducer may convert the light signals to the electrical signals. The frequency modulation of the sampling pulses must be controlled in time by the timing pulses. The point $P_1$ in FIG. 3 denotes the synchronization point. In FIG. 3, the variation in scanning speed $v$ is shown as being continuous, but the sampling pulses $f_s$ may be varied in stepwise so long as the operation is not adversely affected as shown in FIG. 6. The point at which the sampling pulse $f_s$ is changed may be obtained from the signals obtained from the timing pulse generating disk or the timing chart described above. Furthermore, if suitable buffer shift registers are used, the sampling gate may be eliminated, and if the speed is not a serious factor, only one buffer shift register may be employed. In this case, one group of the alternate mirrors on the polyhedral mirror 15 are used for obtaining and transmitting the data while the other group of alternately disposed mirrors are scanning the subject copy.

What is claimed is:

1. A facsimile device of the type comprising:

a. rotating planar mirror means for scanning an imaging point optically and sequentially along a series of lines on a flat subject copy disposed in a plane parallel to and movable along the axis of rotation of said planar mirror means;

wherein the improvement comprises:

b. means for producing video signals indicative of the light characteristics along each of said lines scanned;

c. means for sampling said video signals to obtain a series of data signals indicative of the light characteristics of the successive points sampled along each of said lines scanned;

d. two memory means for receiving said data signals from said sampling means, each of which accepting a number of storage bits equal in number to the number of data signals obtained along one scanning line and each of which stores and shifts said data signals;

e. switching means for switching the feeding of said data signals upon the completion of the scanning of each line, alternately between said two memory means;

f. first means for producing a pulse train for controlling said sampling means and for shifting said two memory means while said data signals are being stored therein;

g. second means for producing a pulse train for shifting the stored data signals at a constant frequency out of one of said two memory means and sending them on a transmission line while said data signals are stored in the other memory means; and h. means for controlling said first pulse train producing means, in response to the scanning speed of the imaging point on the subject copy, for frequency modulating the sampling pulse train and the pulse train which is used to shift the one of said two memory means which is storing the data signals in accordance with said scanning speed.

2. A facsimile device as set forth in claim 1 wherein said means for deriving the video signals comprises an objective lens, a pinhole plate and a photoelectric transducer.

3. A facsimile device as set forth in claim 1 wherein said two memory means comprise buffer shift registers.

4. A facsimile device as set forth in claim 1 wherein said sampling means comprises a threshold circuit and a sampling gate.

5. A facsimile device as set forth in claim 1 further comprising a timing pulse generator for producing a keying signal for synchronizing the means for controlling said first pulse train producing means with the operation of said rotating planar mirror means.

6. A facsimile device as set forth in claim 1 wherein said switching means further comprises:

1. means for switching the output of said first pulse train producing means alternately between said two memory means upon the completion of scanning of each line; and
2. means for switching the output of said second pulse train producing means alternately between said two memory means upon the completion of the scanning of each line.

* * * * *